(12) United States Patent
Hymel et al.

(10) Patent No.: US 10,097,591 B2
(45) Date of Patent: Oct. 9, 2018

(54) METHODS AND DEVICES TO DETERMINE A PREFERRED ELECTRONIC DEVICE

(75) Inventors: James Allen Hymel, Kitchener (CA); Joshua Eddy, Evanston, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 709 days.

(21) Appl. No.: 13/635,375

(22) PCT Filed: Jan. 26, 2012

(86) PCT No.: PCT/US2012/022684
§ 371 (c)(1),
(2), (4) Date: Sep. 14, 2012

(87) PCT Pub. No.: WO2013/112155
PCT Pub. Date: Aug. 1, 2013

(65) Prior Publication Data
US 2013/0198392 A1  Aug. 1, 2013

(51) Int. Cl.
*G06F 15/16* (2006.01)
*H04L 29/06* (2006.01)
(Continued)

(52) U.S. Cl.
CPC ......... *H04L 65/1069* (2013.01); *G06F 3/013* (2013.01); *H04M 1/7253* (2013.01)

(58) Field of Classification Search
CPC .................................. G06F 3/011; G06F 3/013
See application file for complete search history.

(56) References Cited

U.S. PATENT DOCUMENTS 6,643,721 B1 * 11/2003 Sun .............................. 710/62
7,623,892 B2 * 11/2009 Hawkins ........... H04M 1/72527
455/41.2
(Continued)

FOREIGN PATENT DOCUMENTS

DE      102007061537      7/2009
EP           1503273       2/2005

OTHER PUBLICATIONS

The International Search Report and the Written Opinion dated Dec. 4, 2012, in corresponding PCT patent application No. PCT/US2012/022684.
(Continued)

*Primary Examiner* — Umar Cheema
*Assistant Examiner* — Anthony T Rotolo
(74) *Attorney, Agent, or Firm* — Fish & Richardson P.C.

(57) ABSTRACT

A method and electronic devices to provide a preferred device mode on a first electronic device and a second electronic device are described. In one example aspect, the present disclosure describes a method for determining a preferred device on a first electronic device and a second electronic device. The first and second electronic devices may have established a connection between them. The method includes: receiving a request related to an application on the first electronic device; sending the request to the second electronic device; initiating processing the request on the first electronic device; determining which of the first electronic device and the second electronic device is a preferred device to process the request; if the first electronic device is the preferred device, completing processing of the request on the first electronic device; and if the second electronic device is the preferred device, processing the request on the second electronic device.

17 Claims, 12 Drawing Sheets

(51) Int. Cl.
  *G06F 3/01* (2006.01)
  *H04M 1/725* (2006.01)

(56) References Cited

U.S. PATENT DOCUMENTS

| | | | |
|---|---|---|---|
| 2006/0093998 A1* | 5/2006 | Vertegaal | 434/236 |
| 2007/0220562 A1* | 9/2007 | Janssen | H04L 67/04 725/81 |
| 2008/0034081 A1* | 2/2008 | Marshall | G08C 17/02 709/223 |
| 2009/0175268 A1* | 7/2009 | Li | H04L 29/06027 370/352 |
| 2009/0249245 A1 | 10/2009 | Watanabe | |
| 2010/0293598 A1* | 11/2010 | Collart | G06F 17/30056 726/3 |
| 2011/0163944 A1 | 7/2011 | Bilbrey et al. | |
| 2012/0032783 A1* | 2/2012 | Ahn | G06F 3/1423 340/6.1 |
| 2013/0160036 A1* | 6/2013 | Narasimhan | H04N 21/44218 725/9 |

OTHER PUBLICATIONS

Gaze Blink Wave Video File, publicly available on Sep. 13, 2011.

Stack overflow; What determines the monitor my app runs on? http://stackoverflow.com/questions/52755/what-determines-the-monito-my-app-runs-on; retrieved on Oct. 31, 2011.

Shor, Shirley; Smart House; http://shirleyshor.com/text/smart_house. htm; published on 1998 and retrieved on Oct. 31, 2011.

Raducanu, Subramanian et al. ; Human Presence Detection by Smart Devices; available online and retrieved on Oct. 31, 2011.

Vertegaal, Dickie; Eyelook: Using Attention to facilitate mobile media consumption, Human media lab; available online and retrieved on Oct. 31, 2011.

Vertegaal, Dickie; Designing attentive cell phone using wearable eyecontact sensors; available and retrieved Oct. 31, 2011.

Office Action issued in Canadian Application No. 2,861,851 on Nov. 22, 2017; 7 pages.

\* cited by examiner

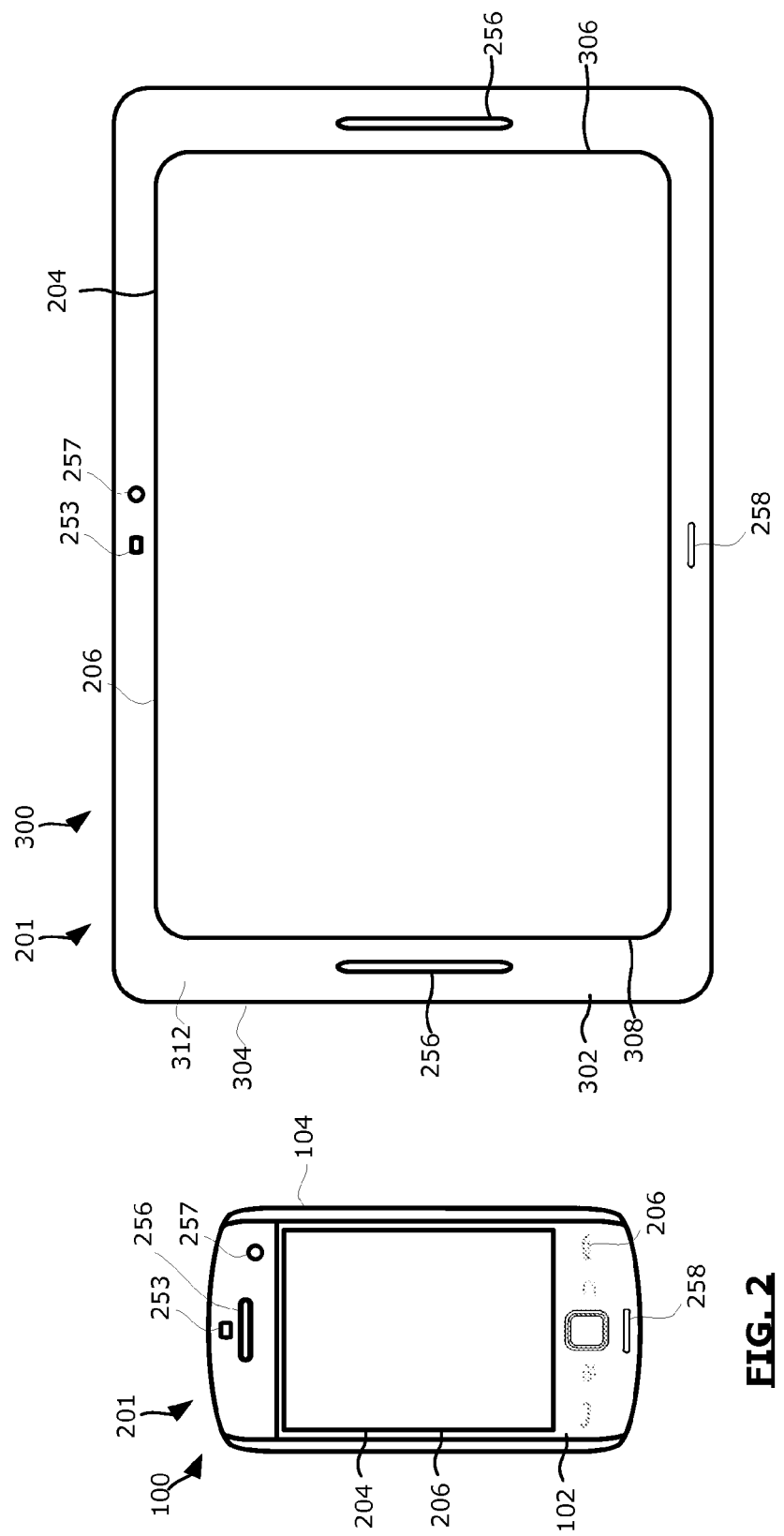

METHODS AND DEVICES TO DETERMINE A PREFERRED ELECTRONIC DEVICE

CROSS REFERENCE TO RELATED APPLICATIONS

This application is a national phase application of international application no. PCT/US2012/022684, filed on Jan. 26, 2012 and entitled "Methods and Devices to Determine a Preferred Electronic Device," which is incorporated herein by reference in its entirety.

TECHNICAL FIELD

The present disclosure relates to electronic devices and, more particularly, to methods and electronic devices to allow a preferred device mode on a plurality of electronic devices.

BACKGROUND

Electronic devices are available in various designs, wherein each design may process requests related to a specific application or applications better than other electronic devices. Furthermore, a user may prefer to use a specific electronic device in relation to a specific application.

In a typical day, multiple electronic devices may be available to process a request; however, each electronic device operates independently. For example, a user may have a smartphone and a television when the user is in his living room. It would be useful to provide methods and apparatus to allow the two electronic devices to connect to one another, a preferred electronic device may be determined to process a request. The two electronic devices may share information to enable a seamless transition from the first electronic device to the second electronic device.

BRIEF DESCRIPTION OF THE DRAWINGS

FIG. 2 is a front view of a smartphone, in accordance with example embodiments of the present disclosure;

FIG. 3 is a front view of a tablet computer, in accordance with example embodiments of the present disclosure;

Like reference numerals are used in the drawings to denote like elements and features.

DETAILED DESCRIPTION OF EXAMPLE EMBODIMENTS

Figure 1:
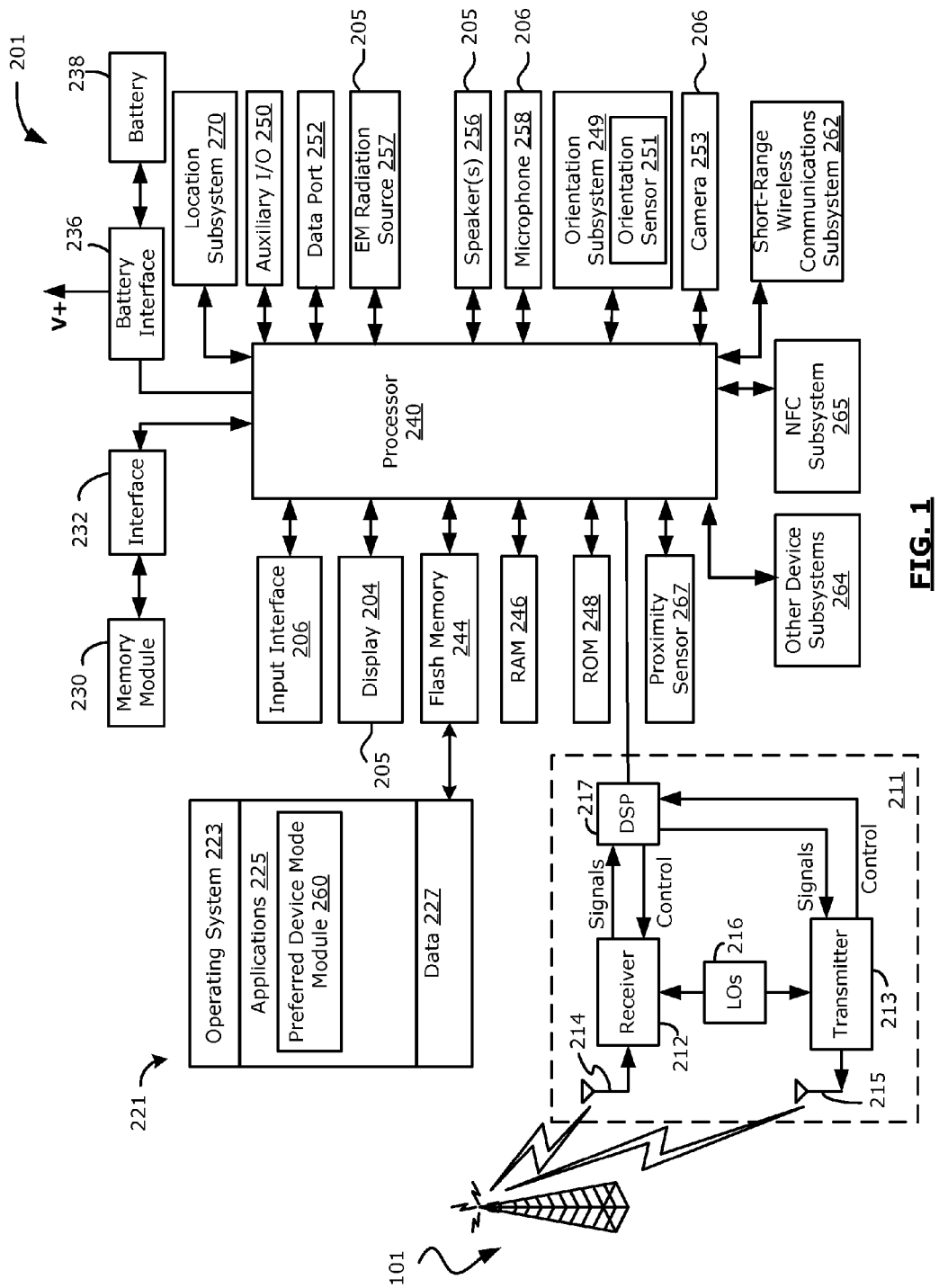
FIG. 1 is a block diagram illustrating an electronic device in accordance with example embodiments of the present disclosure.

In one example aspect, the present disclosure describes a method for determining a preferred device on a first electronic device and a second electronic device. The first and second electronic devices may have established a connection between them. The method includes: receiving a request related to an application on the first electronic device; sending the request to the second electronic device; initiating processing the request on the first electronic device; determining which of the first electronic device and the second electronic device is a preferred device to process the request; if the first electronic device is the preferred device, completing processing of the request on the first electronic device; and if the second electronic device is the preferred device, processing the request on the second electronic device.

In another example aspect, the present disclosure describes a first electronic device. The first electronic device includes: a communication subsystem, an input device, a processor, communicatively coupled to the communication subsystem and the input device, and adapted to: establish a connection with a second electronic device; receive a request related to an application on the first electronic device; send the request to the second electronic device; initiate processing the request on the first electronic device; determine which of the first electronic device and the second electronic device is a preferred device to process the request; if the first electronic device is the preferred device, complete processing the request on the first electronic device; and if the second electronic device is the preferred device, process the request on the first second device.

Other example embodiments of the present disclosure will be apparent to those of ordinary skill in the art from a review of the following detailed description in conjunction with the drawings.

As will be described in greater detail below, at least some example embodiments of the present disclosure describe electronic devices (such as a mobile communication devices including smartphones, tablet computers and wearable computers, such as watches including electronic or digital watches), methods, communication systems, and computer-readable mediums which allow such electronic devices to interact with other electronic devices. More particularly, as will be described in greater detail below, electronic devices may be configured to enter a preferred device mode with other electronic devices. When in the preferred device mode, one or more resources associated with the electronic devices may be shared. For example, a first electronic device may be permitted to use one or more resources associated with a second electronic device when the first electronic device and the second electronic device are in the preferred device mode.

In the preferred device mode, two or more electronic devices operate cooperatively. In some example embodiments, display resources associated with the electronic devices are shared. For example, an electronic device (such as a first electronic device) may be permitted to control a display which is provided on another electronic device (such as a second electronic device) when those two electronic devices are in a preferred device mode. Example preferred device modes will be discussed in greater detail below.

The two or more electronic devices which are configured to enter a preferred device mode with one another may, for example, be any combination of: smartphones, tablet computers, wearable computers (such as watches), mobile telephones or PDAs (personal digital assistants) enabled for local wireless communication, or computer systems. That is, a first electronic device which enters a preferred device mode with a second electronic device may, in various example embodiments, be any one of the electronic devices listed above and the second electronic device may also be any one of the electronic devices listed above. Other types of electronic devices, apart from those specifically listed above, are also possible.

In some example embodiments two or more of the same type of electronic device may enter a preferred device mode. For example, a smartphone may be configured to enter a preferred device mode with another smartphone. By way of further example, a tablet computer may be configured to enter a preferred device mode with another tablet computer.

In some example embodiments, the two or more electronic devices which are configured to enter a preferred device mode with one another may not be of the same type. For example, a smartphone may be configured to enter a preferred device mode with a tablet computer.

A tablet computer (which may also be referred to as a tablet) is a mobile computer which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more.

In at least some example embodiments, at least one of the electronic devices which are configured to enter a preferred device mode with another electronic device may be a slate computer. A slate computer is a tablet computer which does not include a dedicated keyboard. A slate computer may allow for text input through the use of a virtual keyboard or an external keyboard which connects to the slate computer via a wired or wireless connection.

Accordingly, electronic devices which are configured to enter a preferred device mode may take a variety of forms. An example of one such electronic device 201 will now be discussed.

Example Electronic Device

Reference will now be made to FIG. 1 which illustrates an example electronic device 201 in which example embodiments described in the present disclosure can be applied. An electronic device 201 such as the electronic device 201 of FIG. 1 may be configured to enter a preferred device mode with another electronic device 201, which may also be of the type illustrated in FIG. 1. It will be appreciated that one or more of the electronic devices 201 which are configured to enter the preferred device mode may be of a type which differs from the electronic device 201 of FIG. 1 and that some of the features, systems or subsystems of the electronic device 201 discussed below with reference to FIG. 1 may be omitted from electronic devices 201 which are configured to enter a preferred device mode with other electronic devices 201.

In the illustrated example embodiment, the electronic device 201 is a communication device and, more particularly, is a mobile communication device having data and voice communication capabilities, and the capability to communicate with other computer systems; for example, via the Internet. It will, however, be appreciated that the electronic device 201 may take other forms, including any one of the forms listed above.

Depending on the functionality provided by the electronic device 201, in various example embodiments the electronic device 201 may be a multiple-mode communication device configured for both data and voice communication, a mobile telephone, such as a smartphone, a wearable computers such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (of FIG. 3) which surrounds the display 204. In such example embodiments, the frame 312 (of FIG. 3) may be referred to as an active frame since it is capable of acting as an input interface 206. In at least some example embodiments, the touch-sensitive overlay may extend to the sides of the electronic device 201.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may, in at least some example embodiments, include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may include a microphone and/or one or more speakers. In at least some example embodiments, an electronic device 201 may include a plurality of speakers 256. For example, in some example embodiments, the electronic device 201 may include two or more speakers 265. The two or more speakers 256 may, for example, be disposed in spaced relation to one another. That is, in at least some example embodiments, the electronic device 201 may include a first speaker and a second speaker and the first speaker and the second speaker may be spatially separated from one another within the electronic device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some example embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a preferred device mode between the electronic device 201 and another electronic device 201 which may, in at least some example embodiments, be an electronic device 201 which is the same or similar to the electronic device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as preferred device mode module 260. In the example embodiment of FIG. 1, the preferred device mode module 260 is implemented as a stand-alone application 225. However, in other example embodiments, the preferred device mode module 260 could be implemented as part of the operating system 223 or another application 225.

The software applications 225 on the electronic device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device

As discussed above, electronic devices 201 which may collectively enter a preferred device mode may take a variety of forms. For example, in at least some example embodiments, one or more of the electronic devices which are configured to enter a preferred device mode with another electronic device may be a smartphone.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to execute third party applications which are stored on the smartphone.

The smartphone 100 may include the components discussed above with reference to FIG. 1 or a subset of those components. The smartphone 100 includes a housing 104 which houses at least some of the components discussed above with reference to FIG. 1.

In the example embodiment illustrated, the smartphone includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Example Tablet Electronic Device

In at least some example embodiments, the one or more of the electronic devices 201, which are configured to enter a preferred device mode with another electronic device 201, may be a tablet computer. Referring now to FIG. 3, a front view of an example electronic device 201 which is a tablet computer 300 is illustrated.

The tablet computer 300 of FIG. 3 may include many of the same features and components of the smartphone 100 of FIG. 2. However, the tablet computer 300 of FIG. 3 is generally larger than the smartphone 100 of FIG. 2. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

A frame 312 surrounds the display 204. The frame 312 is portion of the housing 304 which provides a border around the display 204. In at least some example embodiments, the frame 312 is an active frame 312. That is, the frame has a touch sensitive overlay which allows the electronic device 201 to detect a touch applied to the frame thus allowing the frame 312 to act as an input interface 206 (of FIG. 1).

The example tablet computer 300 includes a plurality of speakers 256. In the example embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204. Both speakers 256 are disposed on the front side 302 of the tablet computer 300.

The example tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other example embodiments.

The example tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of and/or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of and/or surrounding the front side 302 of the tablet computer 300. Such electromagnetic radiation (or the projection of electromagnetic radiation onto objects) may be captured on images obtained by the camera 253.

Enabling a Preferred Device Mode

Figure 4:
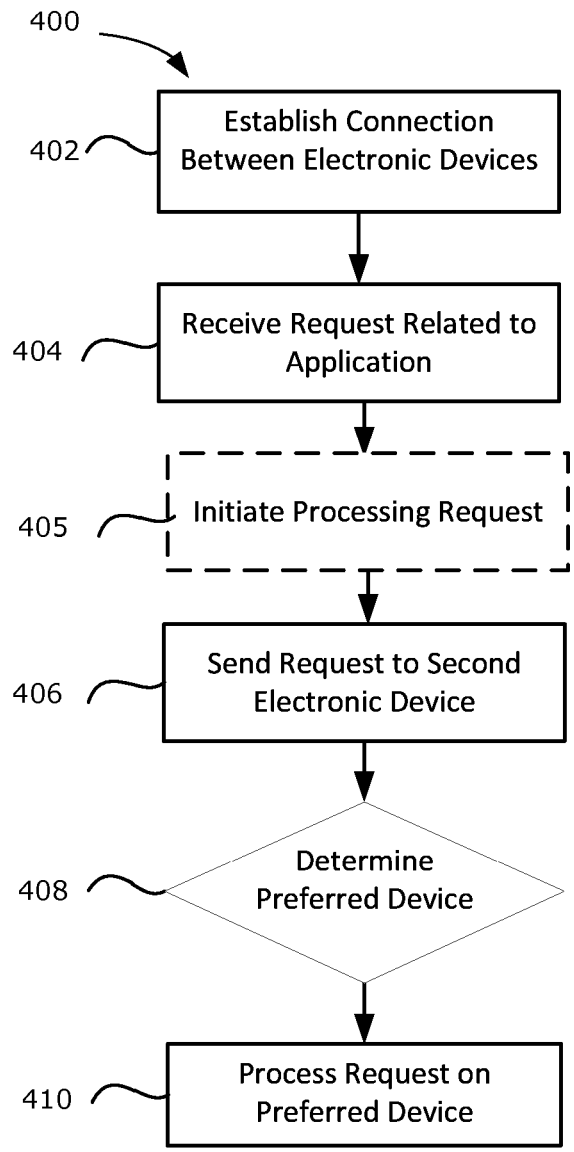
FIG. 4 is a flowchart of a method of entering a preferred device mode on a first electronic device, in accordance with example embodiments of the present disclosure.

Reference will now be made to FIG. 4 which illustrates a flowchart of a method 400 for determining a preferred device between two or more electronic devices 201 to process a request related to an application 225 on the preferred device. The two or more electronic devices 201 may be of the types discussed above with reference to FIGS. 1 to 3. For example, in at least some example embodiments, one or more of the electronic devices 201 may be a smartphone 100 such as the smartphone 100 illustrated in FIG. 2. In at least some example embodiments, one or more of the electronic devices 201 may be a tablet computer, such as the tablet computer 300 discussed above with reference to FIG. 3.

One or more of the electronic devices 201 may be configured to perform the method 400 of FIG. 4. More particularly, the method 400 may be performed by a first electronic device 201 in cooperation with a second electronic device 201.

In at least some example embodiments, the processor 240 (of FIG. 1) of one of the electronic device 201 (of FIG. 1) is configured to perform the method 400. More particularly, in at least some example embodiments, one or more application 225 (of FIG. 1) or module stored in memory of the device 201 (of FIG. 1) may be configured to perform the method 400 of FIG. 4. One or more applications 225 (of FIG. 1) may contain computer readable instructions which cause the processor 240 (of FIG. 1) of the electronic device 201 (of FIG. 1) to perform the method 400. In at least some example embodiments, the preferred device mode module 260 (of FIG. 1) may be configured to perform the method 400 of FIG. 4. More particularly, the preferred device mode module 260 may include computer readable instructions which, when executed, cause the processor 240 (of FIG. 1) to perform the method 400 of FIG. 4.

The method 400 of FIG. 4 may, in at least some example embodiments, be provided by other software applications or modules apart from those specifically discussed above; for example, the operating system 223 (of FIG. 1). Similarly, any portion of the method 400 of FIG. 4 may be performed by or rely on other applications 225 (of FIG. 1) or modules which may interface with preferred device mode module 260 (of FIG. 1).

At 402, two or more electronic devices 201 may establish a connection, enabling the two or more electronic devices 201 to communicate with one another. These electronic devices 201 may include a first electronic device 201 and a second electronic device 201. The two or more electronic devices 201 may establish a wireless connection with one another using short-range wireless communications subsystems 262 associated with each of the electronic devices. Alternatively, the two or more electronic devices 201 may establish a wired connection with one another using auxiliary I/O subsystems 250 associated with each of the electronic devices.

In at least some example embodiments, at 402, the two or more electronic devices 201 may connect via a Bluetooth™ connection. In other example embodiments, other connection protocols may be used. In at least some example embodiments, the connection may be established using short range wireless communications subsystems 262 (of FIG. 1) associated with the electronic devices. In some example embodiments, the electronic devices 201 may connect together directly. In other example embodiments, the electronic devices 201 may connect together through one or more server or network. In at least some example embodiments, the electronic devices 201 may connect together via a Wi-Fi™ connection.

In at least some example embodiments, at 402, the two or more electronic devices 201 may connect via a Universal Serial Bus (USB) connection. In other example embodiments, other connection protocols may be used. In at least some example embodiments, the connection may be established using auxiliary I/O subsystems 250 associated with each of the electronic devices.

In at least some example embodiments, in order to connect, the electronic devices 201 may undergo a pairing process. A pairing process allows a user to control which electronic devices 201 are permitted to connect with one another. In at least some example embodiments, the pairing process may be completed once in order to establish a relationship between two electronic devices 201. After the pairing process is completed, the paired electronic devices 201 have a relationship in which those electronic devices 201 are able to perform more advanced communications with one another. For example, as will be explained below, after those electronic devices 201 are paired, they may be permitted to enter a preferred device mode in response to a receiving a request.

The pairing process is an additional level of security which ensures that the users associated with a pair of electronic devices 201 would like those electronic devices 201 to be able to communicate with one another. When electronic devices 201 have been paired, they may be referred to as bonded electronic devices 201.

The pairing process may be triggered by a specific request from a user to create a bond. For example, a user may select an option to pair an electronic device to another electronic device using a user interface associated with one of the electronic devices. The pairing process may involve user interaction to ensure that users of each electronic device 201 confirm that the electronic devices 201 are to be paired. In at least some example embodiments the pairing process may ensure that a preferred device mode will only occur on electronic devices 201 if those electronic devices 201 have been identified as authenticated. That is, a preferred device mode will only occur if the electronic devices 201 have mutually authenticated one another (i.e. through the pairing process).

During the pairing process, the electronic devices 201 establish a shared secret, which may be referred to as a link key. The link key is stored by both electronic devices 201 which are paired or bonded. Once the pairing process is completed, a bond is formed between the electronic devices which enables those electronic devices to connect to each other in the future without requiring the pairing process in order to confirm the identity of the devices. At the request of a user of either of the electronic devices, this bond can later be severed.

Accordingly, in at least some example embodiments, at 402, two or more electronic devices 201 which have previously undergone a pairing process are communicably connected to one another. That is, the electronic devices 201 establish wireless communications so that data may be shared between the electronic devices 201.

In at least some example embodiments, an operating system 223 or a communication module (such as a Bluetooth™ module) provided on the electronic devices 201 may be configured to perform 402 of FIG. 4.

A request may be related to at least one application 225, and as such a large number of example embodiments are possible, depending on the available applications 225 on one of the electronic devices 201. An example application 225 may be a web browsing application, wherein the request is received at a processor 240 associated with an electronic device 201 to display on a display 204 associated with the electronic device 201 a webpage defined by a Uniform Resource Locator (URL) associated with the webpage. Another example application 225 may be an email application, wherein a request is received at a processor 240 an electronic device 201 to compose a new email message. Yet another example application 225 may be a video playback application, wherein a request is received at a processor 240 an electronic device 201 to playback a video file stored on a memory module 230, or flash memory 244, or any alternate video storage subsystem.

In one example embodiment, a request may be received at a processor 240 associated with a first electronic device 201 from a variety of input devices associated with the first electronic device 201. The input may result from a user interacting with an application 225 to make a request by the use of an input device 206, such as: a keyboard, a mouse, a trackpad, a touch-sensitive display, a three-dimensional gesture device, or other input device allowing human interaction with the application 225. The input may also be in the form of a sensor input associated a first electronic device 201, such as: an orientation sensor 251, a proximity sensor 267, a camera sensor 253, location sensor 270, or other sensor allowing for collection of data associated with the application 225. In some example embodiments, the sensor input may be analyzed by a processor 240 to infer the request related to the application 225. For example, a location sensor 270 may detect that the electronic device 201 is in a location that has been associated with a known request, such as setting a sound profile to "loud".

As previously discussed, at 402 two or more electronic devices 201 may establish a connection, enabling the two or more electronic devices 201 to communicate with one another. A first electronic device 201 may receive a request at 404 related to at least one application 225 and use the established connection from step 402 send the request to a second electronic device 201 at 406 or to a plurality of electronic devices 201, such that the electronic device or devices 201 are able to process the request in a manner similar to the first electronic device 201.

In some example embodiments, the request received at 404 may only be sent to the second electronic device 201 if the second electronic device 201 is a preferred device, wherein determining the preferred device is described later. This example embodiment may be chosen to conserve battery 238 power on both the first electronic device 201 and the second electronic device 201; as transmitting and receiving functionality usually includes additional battery 238 resources. Another example to illustrate a possible advantage for this example embodiment is the reduction in processing overhead associated with sending, receiving, and processing the request, whenever applicable.

An example application 225 may be a web browsing application, wherein a request received at 404 is received at a processor 240 associated with a first electronic device 201 to display on a display 204 associated with the first electronic device 201 a webpage defined by a Uniform Resource Locator (URL) associated with the webpage. At 406, the first electronic device 201 may send the request to a second electronic device 201.

Another example application 225 may be an email application, wherein a request received at 404 is received at a processor 240 associated with a first electronic device 201 to compose an email. At 406, a first electronic device 201 may send the request to a second electronic device 201. The request to compose an email may include any contents of the email, wherein the contents of the email, as an example, may further include a subject, to and from headers, and a body, if such content exists. By sending the contents of the email at least the second electronic device 201 may be able to process the request in a similar manner to the first electronic device 201.

Yet another example application 225 may be a video playback application, wherein a request received at 404 is received at a processor 240 associated with a first electronic device 201 to playback a video file stored on a memory module 230, or flash memory 244, or any alternate video storage subsystem. At 406, the first electronic device 201 may send the request to a second electronic device 201. The request to playback a video may include the electronic video file to playback, or a link to find the video on a shared storage space or on the Internet; thus enabling the second electronic device 201 to playback the video.

In some example embodiments, at 405 a first electronic device 201 may initiate processing a request received at 404 on a processor 240 associated with the first electronic device 201 prior to or after sending the request at 406 to a second electronic device 201. In this example embodiment, the first electronic device 201 may initiate the processing of a request to ensure that the request is completed in a timely fashion if the first electronic device 201 needs to complete processing of the request, as described in greater detail later.

In some example embodiments, initiating processing of a request received at 404 may include processing a subset of all commands associated with the request. In other example embodiments, initiating processing of a request may include processing all commands associated with the request.

An example application 225 may be a web browsing application, wherein a request received at 404 is received at a processor 240 associated with a first electronic device 201 to display on a display 204 associated with the first electronic device 201 a webpage defined by a Uniform Resource Locator (URL) associated with the webpage. In initiating processing of the request, the first electronic device 201 as an example may fetch data associated with the webpage from a server, and cache the data to a memory module 230 associated with the first electronic device 201. As an example, this may allow the first electronic device 201 to complete processing the request more quickly at a later stage if required; i.e. display on a display 204 associated with the first electronic device 201 a webpage defined by a Uniform Resource Locator (URL) associated with the webpage. However, an alternate example embodiment, wherein initiating processing of a request includes processing all commands associated with the request is possible. As an example, this alternate example embodiment is probable if the request requires a shorter processing time than the time required to determine a preferred device. This alternate example embodiment is also probable if the request received on a first electronic device 201 is always to be completed on the first electronic device 201, even if the first electronic device 201 is not the preferred device, as explained later in greater detail.

Another example application 225 may be an email application, wherein a request received at 404 is received at a processor 240 associated with a first electronic device 201 to compose an email. In initiating processing of the request, a first electronic device 201 as an example may display on a display 201 associated with the first electronic device 201 the email application 225. This may allow the first electronic device 201 to accept input related to the email contents. However, the alternate example embodiment, wherein initiating processing of a request includes processing all commands associated with the request is also possible. As an example, this alternate example embodiment may include accepting an additional request to send the email to target recipient.

Another example application 225 may be a video playback application, wherein a request received at 404 is received at a processor 240 associated with a first electronic device 201 to playback a video file stored on a memory module 230, or flash memory 244, or any alternate video storage subsystem. In initiating processing of the request, the first electronic device 201, as an example, may determine the availability and storage location of required software, such as video codec software that enables video decompression of digital video for playback. This may allow the first electronic device 201 to complete processing the request more quickly at a later stage if required; i.e. playback the requested video. Again, an alternate example embodiment, wherein initiating processing of a request includes processing all commands associated with the request is possible.

A processor 240 associated with a first electronic device 201 may determine at 408 which of the first electronic device 201 and the second electronic device 201 is a preferred device to process the request. At least FIGS. 7 to 10 show multiple example embodiments wherein a processor 240 may determine the preferred device, and are described in detail later.

Figure 7:
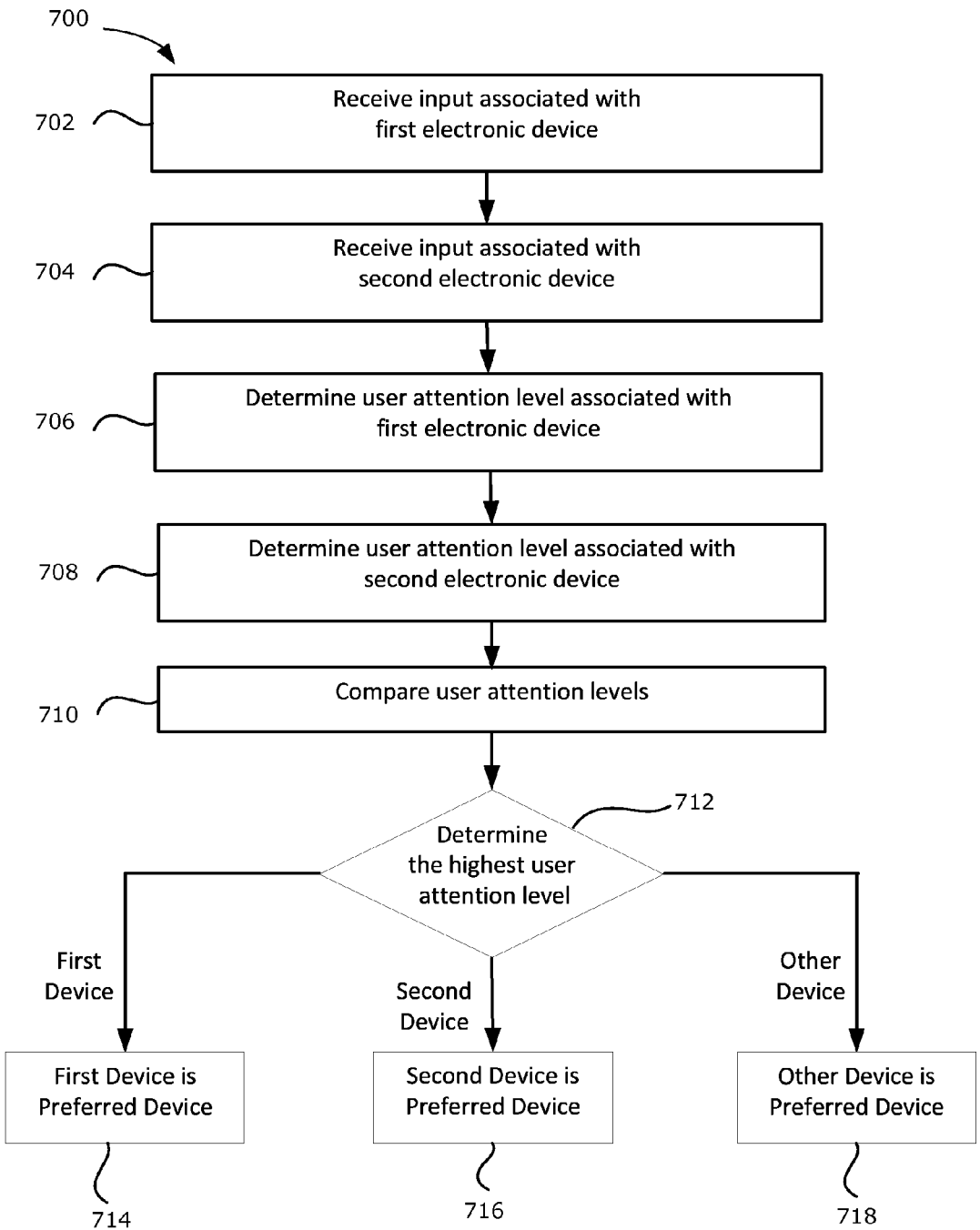
FIG. 7 is a flowchart of a method of determining a preferred device mode by receiving an input, in accordance with example embodiments of the present disclosure.

An example embodiment is described by method 700 of FIG. 7, wherein a method to determine a preferred device at 408 includes receiving an input associated with a first electronic device 702, and an input associated with a second electronic device 704 is shown. In this example embodiment, a user attention level is associated with each input from each electronic device 201, and the device with the higher attention level is determined to be the preferred device. Another example embodiment is described by method 800 of FIG. 8, wherein the input is from a camera sensor 253, the camera sensor adapted to determine a user's point of gaze. A user point of gaze in the direction of an electronic device 201 indicates a high level of user attention associated with that electronic device.

Figure 9:
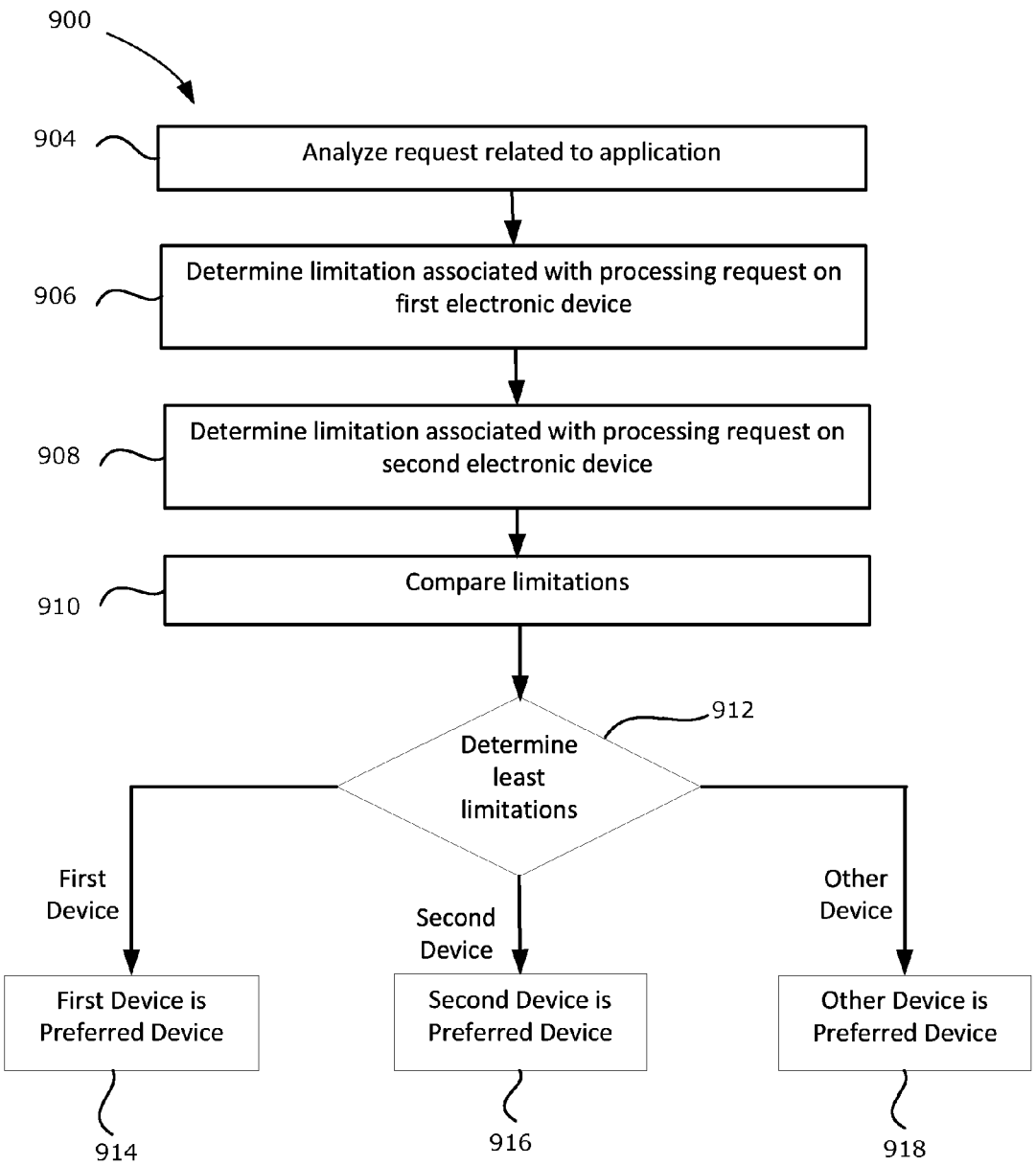
FIG. 9 is a flowchart of a method of determining a preferred device mode by analyzing the request, in accordance with example embodiments of the present disclosure.

An alternate example embodiment is described by method 900 of FIG. 9, wherein a method to determine a preferred device at 408 includes receiving a request and analyzing the request, wherein analyzing the request further includes determining at least one limitation associated with processing the request on the first electronic device 201 or the second electronic device 201. The electronic device with the least number of limitations is determined to be the preferred device. Another example embodiment is described by method 1000 of FIG. 10, wherein a method to determine the preferred device includes receiving a request and analyzing the request, wherein analyzing the request 1004 further includes determining a historical preference associated with the request.

In other example embodiments, any alternate method may be used to determine a preferred device at 408, wherein a preferred device may be determined to provide an advantage associated with a request received at 404. In the design of an electronic device 201, each designer is faced with multiple optimization problems; and as such no one electronic device 201 will provide the best experience for every possible request related to an application 225. As an example, a designer may choose to offer a portable device by sacrificing a larger display 204. A larger display 204 may be preferred for watching videos, in this example. As such, for a request related to a video playback application 225, a preferred device may be a television with a larger display 204 associated with it. However, for the same example, a user may indicate a preference for a portable electronic device 201, with a smaller display 204 associated with it, as described in detail later.

In another device, another electronic device designer may offer a physical keyboard for text entry, which may be the preferred text input device 206 for some, but not all users. As such, for a request received at 404 relating to an email composing application 225, the preferred device determined at 408 may be a device with a physical keyboard for some users, while for other users the preferred device may be a device with a software keyboard on a touch-sensitive display.

By example it may be seen that a plurality of electronic devices 201 may offer varying experiences for the same request received at 404, but furthermore, a first user may have a different preferred device determined at 408 for the request than a second user. In determining the preferred device, as shown by various example embodiments with greater detail later, the electronic device 201 may infer a conclusion from a number of methods by using data from a variety of sources. However, a simpler example embodiment may infer a conclusion from at least one method by using data from at least one source.

At 410, in some example embodiments, if a first electronic device 201 is the preferred device determined at 408, processing of a request received at 404 may be completed on the first electronic device 201. At 410, in other example embodiments, if the first electronic device 201 is the preferred device, processing of the request on the first electronic device 201 may be initiated. However, if the first electronic device 201 is not the preferred device, processing of the request on the first electronic device 201 may be completed or initiated in some example embodiments, while in other example embodiments processing of the request may be stopped. In some example embodiments, the electronic device 201 that is determined not to be the preferred device may complete processing of the request while disabling some features, such as a display 204 associated with that device, either to reduce battery consumption, or to avoid distracting a user.

Similarly at 410, in some example embodiments, if a second electronic device 201 is the preferred device determined at 408, processing of a request received at 404 may be completed on the second electronic device 201. At 410, in other example embodiments, if the second electronic device 201 is the preferred device, processing of the request on the second electronic device 201 may be initiated. In some example embodiments, the request may only be sent to the second electronic device 201 if the second electronic device 201 is a preferred device. However, if the second electronic device 201 is not the preferred device, processing of the request on the second electronic device 201 may be completed or initiated in some example embodiments, while in other example embodiments processing of the request may be stopped.

Figure 5:
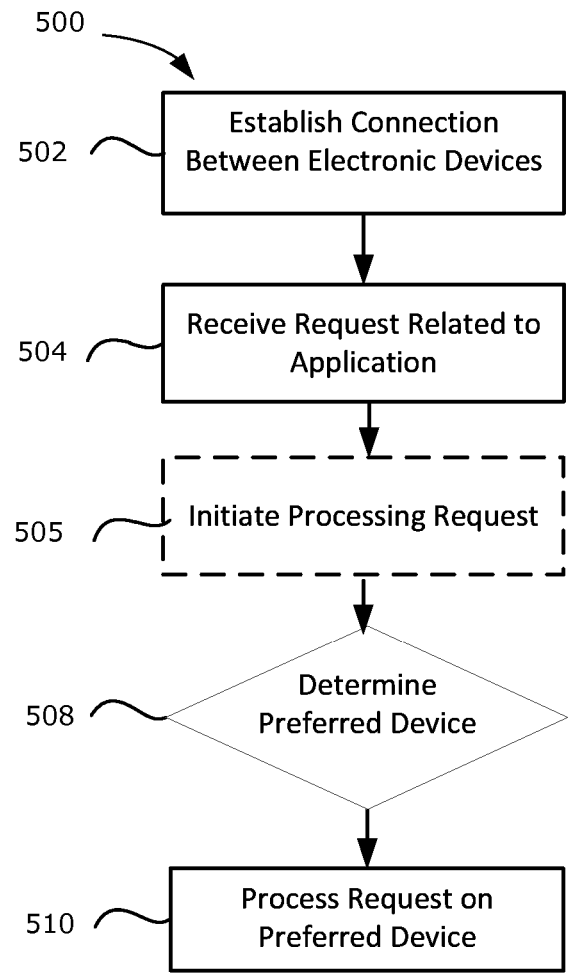
FIG. 5 is a flowchart of a method of entering a preferred device mode on a second electronic device, in accordance with example embodiments of the present disclosure.

Reference will now be made to FIG. 5 which illustrates a flowchart of a method 500 for determining a preferred device between two or more electronic devices 201 to process a request related to an application 225 on the preferred device. The two or more electronic devices 201 may be of the types discussed above with reference to FIGS. 1 to 3. For example, in at least some example embodiments, one or more of the electronic devices 201 may be a smartphone 100 such as the smartphone 100 illustrated in FIG. 2. In at least some example embodiments, one or more of the electronic devices 201 may be a tablet computer, such as the tablet computer 300 discussed above with reference to FIG. 3.

At 502, two or more electronic devices 201 may establish a connection, enabling the two or more electronic devices 201 to communicate with one another. These electronic devices 201 may include a first electronic device 201 and a second electronic device 201. The two or more electronic devices 201 may establish a wireless connection with one another using short-range wireless communications subsystems 262 associated with each of the electronic devices. Alternatively, the two or more electronic devices 201 may establish a wired connection with one another using auxiliary I/O subsystems 250 associated with each of the electronic devices.

A request may be related to at least one application 225, and as such a large number of example embodiments are possible, depending on the available applications 225 on one of the electronic devices 201. An example application 225 may be a web browsing application, wherein the request is received at a processor 240 associated with an electronic device 201 to display on a display 204 associated with the electronic device 201 a webpage defined by a Uniform Resource Locator (URL) associated with the webpage. Another example application 225 may be an email application, wherein a request is received at a processor 240 an electronic device 201 to compose a new email message. Yet another example application 225 may be a video playback application, wherein a request is received at a processor 240 an electronic device 201 to playback a video file stored on a memory module 230, or flash memory 244, or any alternate video storage subsystem.

As previously discussed, at 502 two or more electronic devices 201 may establish a connection, enabling the two or more electronic devices 201 to communicate with one another. In one example embodiment, a request at 504 may be received from a first electronic device 201 at second electronic device 201 through a variety of communication protocols, using the connection established at 502. A wired or a wireless communication medium may be used. In some example embodiments, the request may only be received at the second electronic device 201 if the second electronic device 201 is a preferred device.

An example application 225 may be a web browsing application, wherein a request received at 504 is received at a processor 240 associated with a second electronic device 201 to display on a display 204 associated with the second electronic device 201 a webpage defined by a Uniform Resource Locator (URL) associated with the webpage.

Another example application 225 may be an email application, wherein a request received at 504 is received at a processor 240 associated with a second electronic device 201 to compose an email. The request to compose an email may include any contents of the email, wherein the contents of the email, as an example, may further include a subject, to and from headers, and a body, if such content exists.

Yet another example application 225 may be a video playback application, wherein a request received at 504 is received at a processor 240 associated with a second electronic device 201 to playback a video file stored on a memory module 230, or flash memory 244, or any alternate video storage subsystem. The request to playback a video may include the electronic video file to playback, or a link to find the video on a shared storage space or on the Internet; thus enabling the second electronic device 201 to playback the video.

In some example embodiments, at 505 a second electronic device 201 may initiate processing a request received at 504 on a processor 240 associated with the second electronic device. In this example embodiment, the second electronic device 201 may initiate the processing of a request to ensure that the request is completed in a timely fashion if the second electronic device 201 needs to complete processing of the request, as described in greater detail later. Furthermore, in some example embodiments, initiating processing of a request may include processing a subset of all commands associated with the request. In other example embodiments, initiating processing of a request may include processing all commands associated with the request. Initiating processing of the request on a second electronic device may apply to any request, as demonstrated earlier with example embodiment applications 225.

A processor 240 associated with a second electronic device 201 may determine at 508 which of the first electronic device 201 and the second electronic device 201 is a preferred device to process the request. At least FIGS. 7 to 10 show multiple example embodiments wherein a processor 240 may determine the preferred device, and are described in detail later. The same methods used to determine a preferred device on the first electronic device 201 may be used on the second electronic device 201 to determine the preferred device; therefore all examples may apply to either the first electronic device 201 or the second electronic device 201.

At 510, in some example embodiments, if a second electronic device 201 is the preferred device determined at 508, processing of a request received at 504 may be completed on the second electronic device 201. At 510, in other example embodiments, if the second electronic device 201 is the preferred device, processing of the request on the second electronic device 201 may be initiated. However, if the second electronic device 201 is not the preferred device, processing of the request on the second electronic device 201 may be completed or initiated in some example embodiments, while in other example embodiments processing of the request may be stopped.

Similarly at 510, in some example embodiments, if a first electronic device 201 is the preferred device determined at 508, processing of a request received at 504 may be completed on the first electronic device 201. At 510, in other example embodiments, if the first electronic device 201 is the preferred device, processing of the request on the first electronic device 201 may be initiated. However, if the first electronic device 201 is not the preferred device, processing of the request on the first electronic device 201 may be completed or initiated in some example embodiments, while in other example embodiments processing of the request may be stopped.

Figure 6:
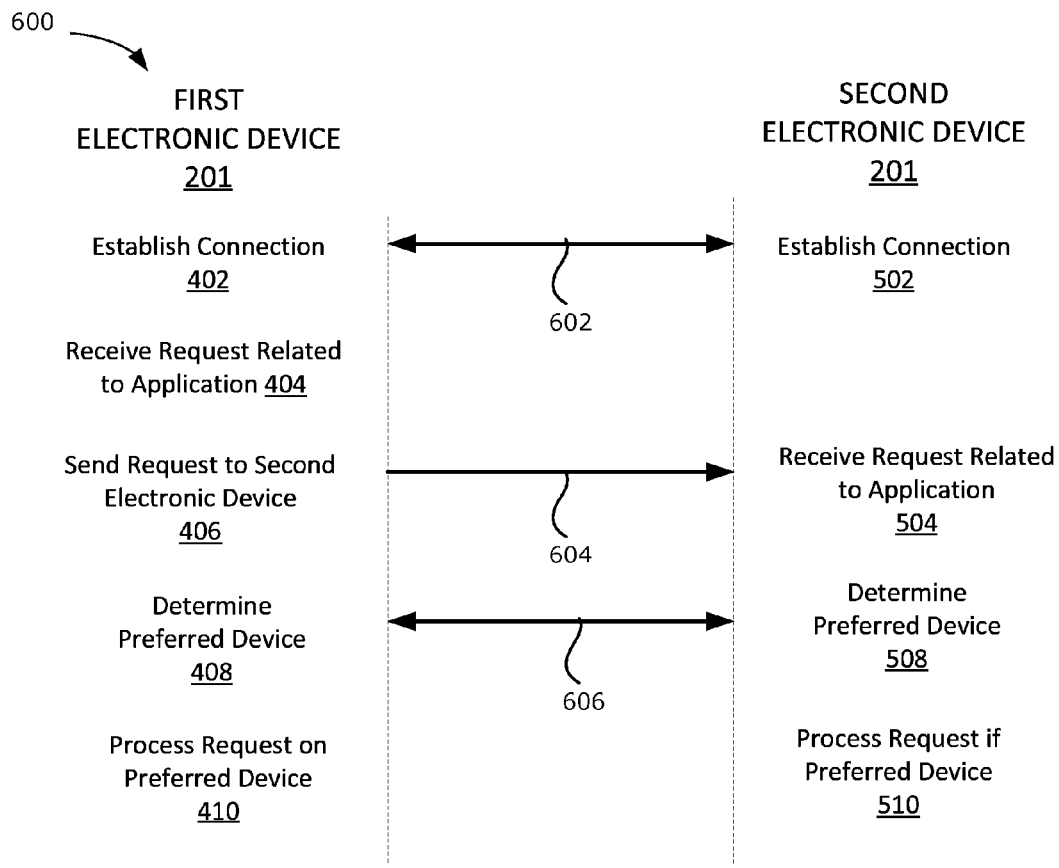
FIG. 6 is an illustration of the communication between two electronic devices for determining a preferred device between two electronic devices, in accordance with example embodiments of the present disclosure.

Reference will now be made to FIG. 6 which illustrates the communication between two electronic devices for at least one example embodiment for determining a preferred device between two electronic devices 201. The two or more electronic devices 201 may be of the types discussed above with reference to FIGS. 1 to 3. For example, in at least some example embodiments, one or more of the electronic devices 201 may be a smartphone 100 such as the smartphone 100 illustrated in FIG. 2. In at least some example embodiments, one or more of the electronic devices 201 may be a tablet computer, such as the tablet computer 300 discussed above with reference to FIG. 3.

A first electronic device 201 and a second electronic device may establish a wireless or wired connection between one another. The communication between the two devices is shown by 602 of FIG. 6. At some point prior to or following the establishment of the connection, a direct or indirect interaction with the first electronic device may result in a request received at 404 related to an application 225 on the first electronic device being sent, wherein the request is received at a processor 240 associated with the first electronic device 201. The first electronic device 201 may initiate processing the request at any point, wherein the processing may also be completed at any point. The first electronic device 201 may send the request to the second electronic device 201, as shown by 604, wherein the request is received at a processor 240 associated with the second electronic device, at 504. The second electronic device 201 may also initiate processing the request at any point, wherein the processing may also be completed at any point.

In some example embodiments, the request received at 404 may be received at a processor 240 associated with the first electronic device 201 prior to establishing a connection between the two electronic devices. In such example embodiments, the request may be sent once a connection has been established, wherein it is sent to the second electronic device 201, as shown by 604.

Each of the first electronic device 201 and the second electronic device 201 may executed a method, such as example methods 700, 800, 900 and 1000 to determine the electronic device 201. In some example embodiments, determining the preferred device on the first electronic device 201 may apply the same methods as determining a preferred device on a second electronic device 201. However, in other example embodiments, the first electronic device 201 and the second electronic device 201 may rely on a different method and/or a different set of data; hence the preferred device determined at 408 and the preferred device determined at 508 may be determined differently.

In further example embodiments, the two electronic devices 201 may exchange data, as shown by 606, and only one electronic device is required to determine the preferred device. The data may include commands, or data associated with the user or the request. An example of such data may be a user attention level associated with an electronic device 201, or historical data associated with the request. By having all data associated with the request on one device, the method that may be executed to determine the preferred device may be able to determine the preferred device more accurately, as may be appreciated by a person skilled in the art.

Reference will now be made to FIG. 7 which illustrates a method 700, an example embodiment for determining a preferred device between two electronic devices 201 by determining a user attention level. The two or more electronic devices 201 may be of the types discussed above with reference to FIGS. 1 to 3. For example, in at least some example embodiments, one or more of the electronic devices 201 may be a smartphone 100 such as the smartphone 100 illustrated in FIG. 2. In at least some example embodiments, one or more of the electronic devices 201 may be a tablet computer, such as the tablet computer 300 discussed above with reference to FIG. 3.

At 702, at least one input may be received at a processor 240 associated with first electronic device 201, wherein the input or inputs may indicate a user attention level associated with the first electronic device 201. At 704, at least one input may be received at a processor 240 associated with the second electronic device 201, wherein the input or inputs may indicate a user attention level associated with the second electronic device 201. In an example embodiment, a processor 240 associated with a first electronic device 201 may receiving a keyboard input, indicating that a user is actively using the first electronic device 201. The active use of an electronic device may indicate a high user attention level associated with the first electronic device 201. Furthermore, any input device 206 associated with the first electronic device may be used. In an alternate example embodiment, a processor 240 associated with a second electronic device 201 may receive no input. When receiving no input, an indication may be inferred that user attention level associated with the second electronic device is low.

Figure 8:
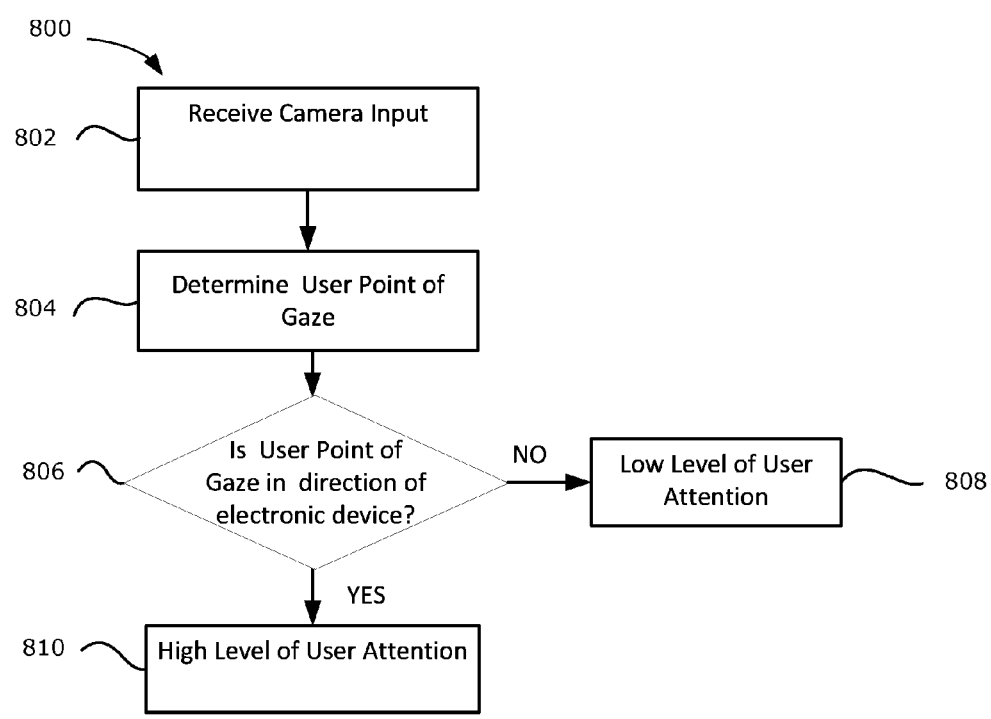
FIG. 8 is a flowchart of a method of determining a preferred device mode by receiving an input from a camera sensor, in accordance with example embodiments of the present disclosure.

In another example embodiment, the input may be sensor input, wherein example sensors include: a camera 253 input, an accelerometer 251 input, a proximity sensor, a touch sensitive sensor, a light sensor, a three-dimensional sensor, or a MEMS sensor. Other sensors communicatively coupled to a processor 240 may also be considered. A processor 240 associated with an electronic device 201 may infer a user attention level associated with the electronic device 201 from the sensor input. An example embodiment of such inference utilizing a camera sensor is illustrated in FIG. 8, and detailed later in this disclosure. In another example embodiment, a proximity sensor may give the processor 240 an indication that the user attention level is high if the proximity sensor detects a close proximity between the sensor and a user; as this may indicate that the user is interested in interacting with the electronic device 201.

In some example embodiments, determining the user attention level associated with an electronic device 201 may include quantifying the value to represent the user attention level. In other example embodiments, the user attention level associated with an electronic device 201 may be given as a tiered value, such as low, medium, or high.

To quantify the user attention level, in some example embodiments, a user attention level at each input device 206 may be further characterized, and given a weighting depending on the likelihood of obtaining an accurate indication of the user attention level from each input device 206. In some example embodiments, a higher weighting is given to a user attention level at an input device 206 that involves direct user interaction, such as a keyboard or a touch sensitive display, and a lower weighting is given to a user attention level at an input device 206 that may require some inference to determine a user attention level, such as a camera sensor, or a proximity sensor. In some example embodiments, the weighting may further be altered as the method is used; the determined user attention level may be evaluated for accuracy each time, and a database may be built to include this information, and the weightings adjusted to give more relevance to the more accurate input devices 206. As an example, if the user attention level associated with the second electronic device 201 is determined to be high based on input from a camera 253 sensor, the first device 201 may receive data from the second device 201 indicating whether the second electronic device 201 was activated by a user.

At 706, a first electronic device 201 may determine a user attention level associated with the first electronic device 201, and at 708, a second electronic device 201 may determine a user attention level associated with the second electronic device 201. Furthermore, the first electronic device 201 may send the user attention level associated with the first electronic device 201 to the second electronic device 201 through the established connection, as conveyed by 606 (of FIG. 6). Similarly, the second electronic device 201 may send the user attention level associated with the second electronic device 201 to the first electronic device 201.

At 710, at least one of the two devices 201 may compare the user attention level associated with the first electronic device 201 with the user attention level associated with the second electronic device 201. This may involve comparing a numerical value or a tiered value associated with each device. At 712, at least one of the two devices 201 may determine the device associated with the highest user attention level, based on the previous comparison. If the first electronic device 201 is determined to have the highest user attention level associated with it, then at 714 the first electronic device 201 is determined to be the preferred device. Similarly, the second electronic device 201 may be the preferred device at 716, or another electronic device 201 may be the preferred device at 718 if more than two devices are available.

Reference will now be made to FIG. 8 which illustrates a method 800, an example embodiment for determining a user attention level associated with an electronic device 201. The electronic device 201 in method 800 may be any electronic device 201 that includes at least a camera sensor 253 and an eye tracking application 225 or a gaze tracking application 225. An eye tracking application 225 or a gaze tracking application 225 uses a camera sensor 253 input to determine a point of gaze associated with a user.

By way of background, the concept of eye tracking is well known and a number of different techniques have been developed for accomplishing eye tracking. A commonly used technique is based on so-called pupil center corneal reflection (PCCR) methods. PCCR methods typically involve using a camera sensor 253 to capture an image of a user while the user is being illuminated by the light source. It has been found that PCCR methods may work optimally when using an infrared light source; however, the principles may be applied using visible light sources. The light source illuminates the user's eyes and the illumination causes highly visible reflections of the light in parts of the user's eyes. A fraction of the light enters the pupil and is reflected off the retina to identify the pupils of the eyes. A fraction of the light is reflected off the cornea of the eyes, the reflection often referred to as a "glint". Using known image processing techniques, the centers of the pupil and the glint are identified and a vector from the center of the glint to the center of the pupil is calculated. The direction of this vector provides gaze direction information which is used with the distance between the camera sensor 253 and the user's eyes to calculate the point of regard using known methods.

At 802, an electronic device 201 may receive a camera input, wherein the camera input may include an image of the current operating environment. The camera sensor 253 may feature a light emitting device, such as a flash or an infra-red light source to enable the sensor 253 to detect an image in low light conditions. The eye tracking application may include an eye detection module, wherein at least one eye may be detected in the image. Furthermore, the eye tracking application may include a gaze detection module, wherein a gaze direction of the eye is detected.

At 804, a user point of gaze is determined; as the gaze direction of the eye is presumed to be associated with a user. Further, since the camera sensor is associated with the electronic device 201, the user point of gaze is associated to the electronic device 201 at 806. At 810, a user that is determined to be gazing at the electronic device 201 has demonstrated a high level of attention associated with the electronic device 201. At 808, a user that is determined to not be gazing at the electronic device 201 has demonstrated a low level of attention associated with the electronic device 201.

In some example embodiments, the method 800 may be executed in real-time or near real-time, wherein a camera input is received at 802 very shortly prior to determining a user attention level at 806. A delay between receiving the camera input at 802 and determining the user attention level at 806 may reduce the likelihood of accurately determining the user attention level. A user is expected to move, and a user point of gaze may vary every second. As such, in some example embodiments, multiple inputs collected over a period of time from the camera sensor 253 at 802 wherein the user point of gaze is determined at 804 to be in the direction of the electronic device 201 may be required to determine that a high level of user attention is associated with the electronic device 201.

Other methods may be used to determine the preferred device. Reference will now be made to FIG. 9 which illustrates a method 900, an example embodiment for determining a preferred device between two electronic devices 201 by determining the device with the least limitations. The two or more electronic devices 201 may be of the types discussed above with reference to FIGS. 1 to 3. For example, in at least some example embodiments, one or more of the electronic devices 201 may be a smartphone 100 such as the smartphone 100 illustrated in FIG. 2. In at least some example embodiments, one or more of the electronic devices 201 may be a tablet computer, such as the tablet computer 300 discussed above with reference to FIG. 3.

Two or more electronic devices 201 may be communicatively coupled, as shown in FIG. 6. Further, a request related to an application 225 may be received at a processor 240 associated with one of the electronic devices 201. At 904, the processor may analyze the request to determine the type of content associated with the request, any limitations associated with processing the request, and/or any errors associated with processing the request.

The type of content associated with the request may fall into one or more categories, wherein an example list of categories may include pictures, video, web sites, games, emails, word processing documents, spreadsheets, or others. This may be inherent from the application 225 to which the request is related.

Limitations associated with processing the request may arise from many factors. For each application and request, a different set of limitations may be analyzed. Furthermore, a limitation associated with processing the request may cause an error to occur. In another example embodiment, more than one limitation associated with processing the request on a first electronic device 201 may occur. In another example embodiment, a second electronic device may have other limitations associated with processing the request.

In one example embodiment, an example limitation may be associated with processor hardware or software limitation may prevent decoding a video file associated with the request. The processor may lack the hardware resources to complete the necessary processing of the request in a given time period, or the processor may lack the software required to decode the video. A quick processor may be preferred for decoding a video file to ensure a high playback frame rate. However, when composing an email, a more power efficient processor may be desirable.

In another example embodiment, an example limitation may be associated with a display hardware or software. A display may be determined to have a small resolution or a low contrast ratio, wherein displaying a request related to a video application 225 may be possible, but undesirable. Video playback on a small display may be considered a limitation, but reading a short message may be preferred on the small display for ease of portability.

In another example embodiment, an example limitation may be associated with an input hardware or software. A first input device 206 may be deemed undesirable for typing long documents, such as an email message, whereas a second input device 206 may be deemed to be more desirable for such applications 225.

In another example embodiment, an example limitation may be associated with an output hardware or software. For example, a first electronic device 201 may have a required output hardware communicatively coupled it, such as a printer. A second electronic device may not be able to connect to a printer to due to lack of support. If the request is related to a printing application 225, such a limitation may be considered.

In another example embodiment, an example limitation may be associated with a communication subsystem. For example, one of the two electronic devices 201 may not have a communication subsystem capable of connecting to a WAN, and hence may not have access to Internet based services. For requests related to Internet applications 225, such as web browsing, a preference may be given to the WAN connected electronic device 201. Furthermore, both electronic devices 201 may be connected a WAN, however, one of two electronic devices 201 may have further limitations associated with the services that electronic device 201 is allowed to access.

In another example embodiment, an example limitation may be associated with the memory associated with one of the two electronic devices 201. An electronic device 201 may not have enough memory available to process a memory intensive request. Furthermore, storage memory may be required to complete a request, which may not be available.

Limitations associated with processing a request may also be determined as the request is being processed by the occurrence of an error. An application 225 may be able to detect the occurrence of an error during processing of the request. An error message may be displayed on a display 204 associated with the electronic device 201. The error may prevent complete processing of the request on a first electronic device 201, but on a second electronic device 201, the processing of the request may be completed without an occurrence of an error. An error may occur due to a software bug; however as will be appreciated by those skilled in the art, a software bug may only occur on a subset of devices capable of executing an application 225 and processing the request. In other example embodiments, an error may occur due to a limitation associated with processing the request, as discussed earlier.

At 906, at least one limitation in processing the request on a first electronic device is determined. At 908, at least one limitation in processing the request on a second electronic device is determined. At least one of the electronic devices 201 may receive the limitations associated with each electronic device, through an established connection. At 910, at least one of the electronic devices 201 may compare the limitations associated with each of the electronic devices 201, and at 912 determine an electronic device 201 with the least number of limitations.

To quantify the limitation, in some example embodiments, each limitation 206 may be characterized, and given a weighting depending on the likelihood of such a limitation adversely affecting the processing of the request. In some example embodiments, a higher weighting is given to limitations that may prevent processing of the request, such as the occurrence of an error. Other limitations that are based on user preference may be given a lower weighting; such as a preference for an input device associated with the request. In some example embodiments, the weightings may be adjusted by building a database including information related to the limitations for each device.

In some example embodiments, two or more communicatively coupled electronic devices 201 may send to each other a list, wherein the list includes at least one of input and output devices, or sensors, or software services, or applications 225 associated with the electronic device 225. This list may allow the electronic devices 201 to compare limitations associated with each electronic device, to allow for the determination of a preferred device.

At 914, 916, and 918 a preferred device may be determined, after comparing the limitations associated with each electronic device 201. A first, second or other electronic device 201 may be determined to be the preferred device. The other electronic may be the preferred device if more than two electronic devices 201 have an established connection.

Figure 10:
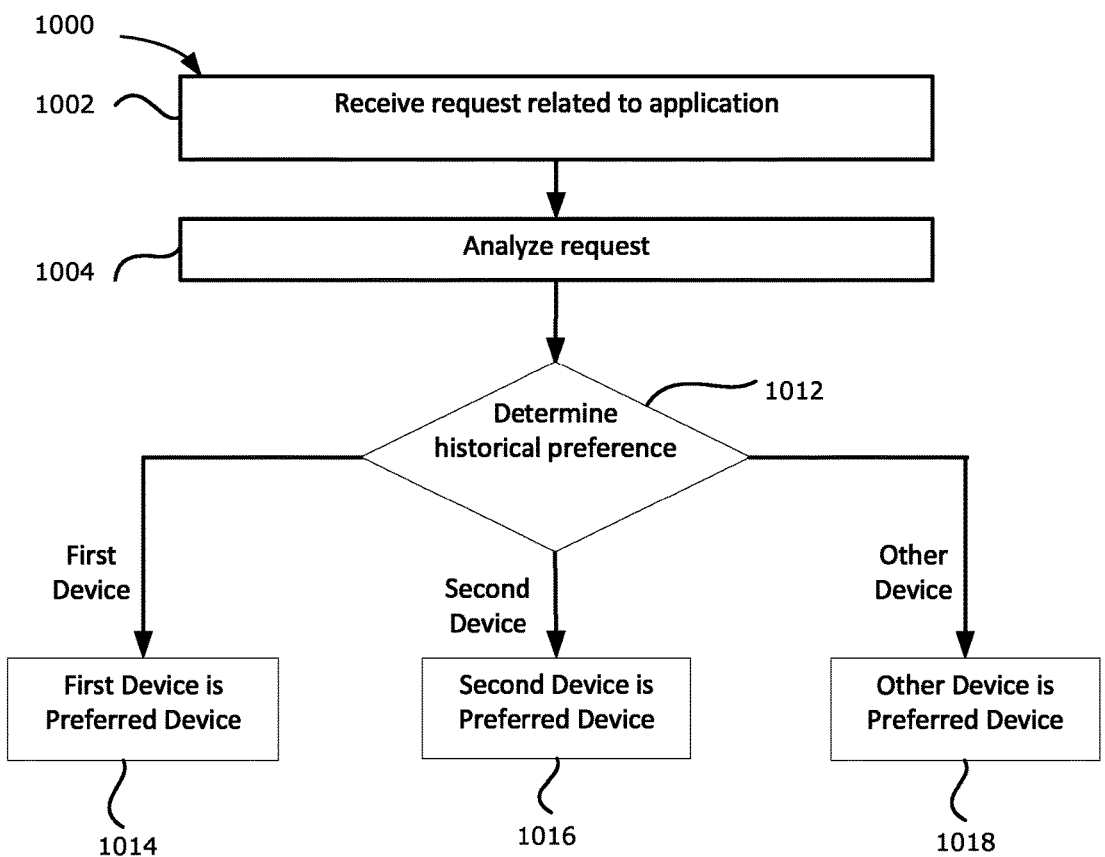
FIG. 10 is a flowchart of a method of determining a preferred device mode by analyzing the request to determine a historical preference, in accordance with example embodiments of the present disclosure.

Reference will now be made to FIG. 10 which illustrates a method 1000, an example embodiment for determining a preferred device between two electronic devices 201 by determining a historical preference associated with a request.

Two or more electronic devices 201 may be communicatively coupled, as shown in FIG. 6. Further, at 1002, a request related to an application 225 may be received at a processor 240 associated with one of the electronic devices 201. At 1004, the processor may analyze the request to determine any historical preference associated with the request.

For each request related to an application 225, a user may have defined a preferred device. A database including a preferred device for all requests or for a subset of requests may be available. For example, the database may include a field associated a first device as the preferred device for video related applications. This association may be made by the use of a method to determine a preferred device, such as example methods 700, 800 or 900, or by allowing the user to enter their preferred device. In other example embodiments, the database may include a condition for choosing the preferred device. The condition may be based on any of the previously discussed limitations or inputs. For example, a user may indicate that an electronic device 201 for video playback is preferred if it has the largest display 204 associated with it. In another example, a user may indicate that a preferred device is a portable electronic device 201, but only if an orientation sensor 251 indicated that the electronic device is being moved.

In other example embodiments, a historical preference may be determined based on the number of times a user chooses to use an electronic device 201 to complete processing a request. A database may be created to include this information, and may be regularly updated.

At 1012, a historical preference associated with the request may be determined. At 1014, 1016, and 1018 a preferred device may be determined. A first, second or other electronic device 201 may be determined to be the preferred device. The other electronic may be the preferred device if more than two electronic devices 201 have an established connection.

An Example Embodiment Relating to a Web Browsing Application

Figure 11:
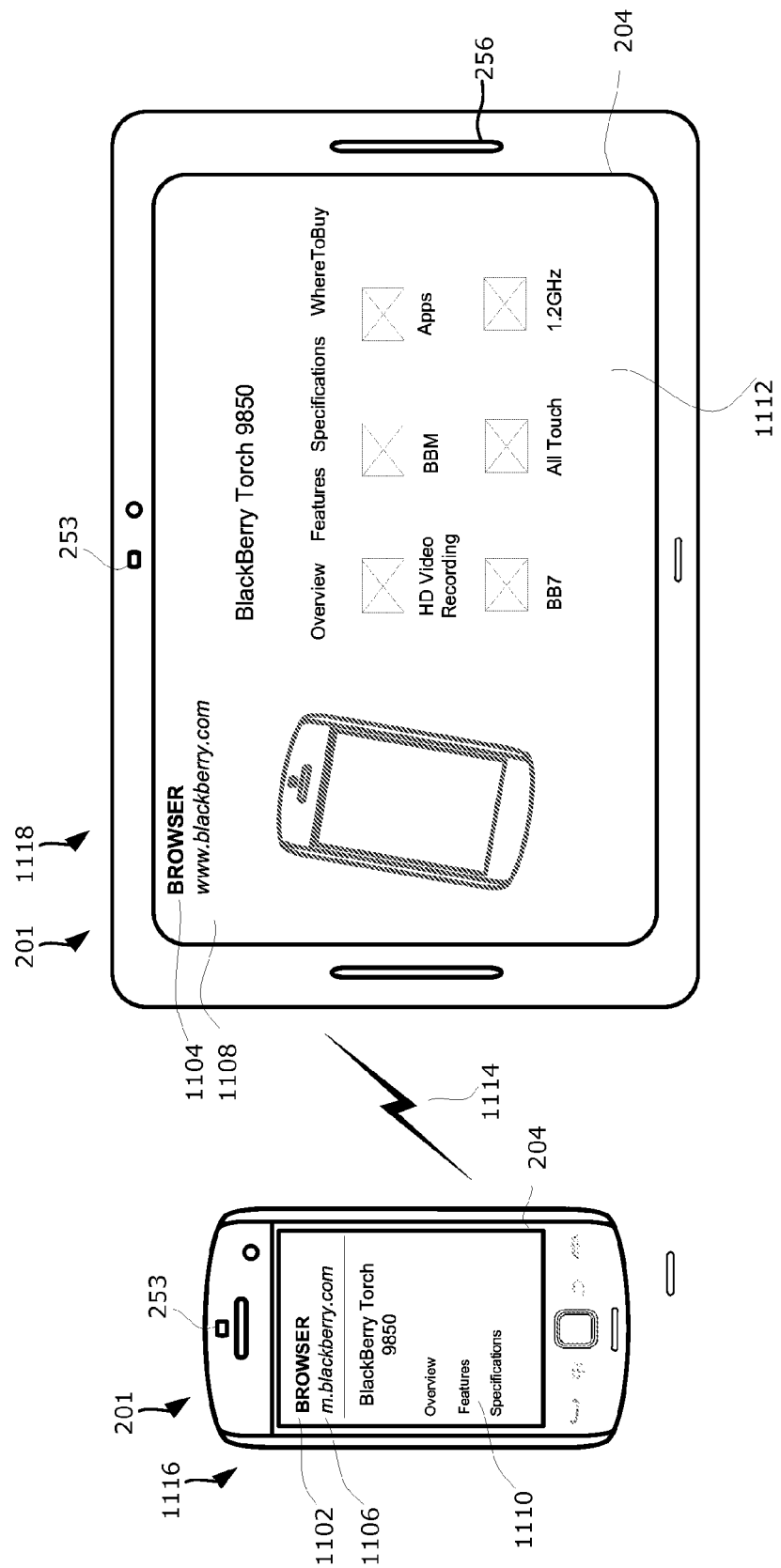
FIG. 11 illustrates an example embodiment of a smartphone and a tablet in a preferred device mode related to a web browsing application.

Reference will now be made to FIG. 11 which illustrates an example embodiment for determining a preferred device between two electronic devices 201, wherein the application 225 is a web browsing application. In this example embodiment, the first electronic device 1116 is a smartphone, such as the smartphone illustrated in FIG. 2, and the second electronic device 1118 is a tablet computer, such as the tablet computer illustrated in FIG. 3.

In this example embodiment, the first electronic device 1116 and the second electronic device 1118 have established a direct wireless connection 1114, using a short-range wireless communications subsystem 262, for example via a Bluetooth™ connection.

The first electronic device 1116 may receive a request related to a web browser application 1102 to visit a URL. In processing the request, the web browser application 1102 may visit an equivalent web page, associated with the URL, but the web page is optimized for a smartphone. When placing a request to a web server via a wireless network 101, the web browser application 1102 may send a packet to identify the electronic device 1116 to the web server as a smartphone. The web server may determine to respond with a smartphone optimized equivalent web page. The URL of the smartphone optimized equivalent web page 1106 may have an "m" prefix, such as "m.blackberry.com". Other prefixes are also common place, such as "mobile" or "touch" or "lite". The smartphone optimized equivalent web page 1106 may include content 1110, a generally reduced subset of the content available. This reduced subset may include text, hyperlinks, and low resolution images. In comparison, the non-optimized web page may contain a much richer graphical content, including sounds and videos. The smartphone optimized equivalent web page 1106 is designed to work best when accessed from a portable and small smartphone, which may have processing hardware and software limitations, and input and output hardware and software limitations associated with it, as discussed previously. To circumvent these limitations, a smartphone optimized equivalent web page 1106 presents a reduced subset of the content available.

However, in this example embodiment, the first electronic device 1116 sends the request to the second electronic device 1118. The second electronic device 1118, a tablet computer does not have the same processing hardware and software limitations, and input and output hardware and software limitations associated with it. For example, the display 204 associated with the second electronic device 1118 is much larger than the display 204 associated with the first electronic device 1116. Furthermore, the tablet computer may also have a faster processor 240 to process a request more quickly, with all required software components associated with the request available to process the request. Thus, by utilizing method 900 to determine the preferred device, the first electronic device 1116 may determine that the second electronic device 1118 is the preferred device. The two electronic devices may exchange a list of limitations with each other shortly after establishing a connection 1114. In other example embodiments, an error in processing the request on the first electronic device 1116 may arise, for example due to the lack of required software to executed a video component of the web page an error may occur.

In other example embodiments, the method 1000 may be used as previously described to determine that historically, the user has preferred to use the second electronic device 1118 for web browsing applications 225. Alternatively, by placing the first electronic device 1116 flat on a table surface, and picking up the second electronic device 1118, an orientation sensor input may indicate to that the second device 1118 is a preferred device, as described by method 700. The user attention level associated with the first electronic device 1116 drops when it is placed flat on a surface and the user attention level associated with the second electronic device 1118 increased when it is picked up. An orientation sensor is able to detect these changes, as it detects changes in gravitational fields, and any movement associated with the electronic device can cause a variation in the signal received by the orientation sensor, as is known by those skilled in the art.

The second electronic device 1118 may receive the request related to web browser application 1104 to visit a URL. In processing the request, the web browser application 1104 is able to retrieve the requested web page, without resorting to an optimized equivalent web page with a reduced subset of the content. Webpage 1112 is retrieved and displayed on the display 204 associated with the second electronic device 1118.

An Example Embodiment Relating to an Email Application

Figure 12:
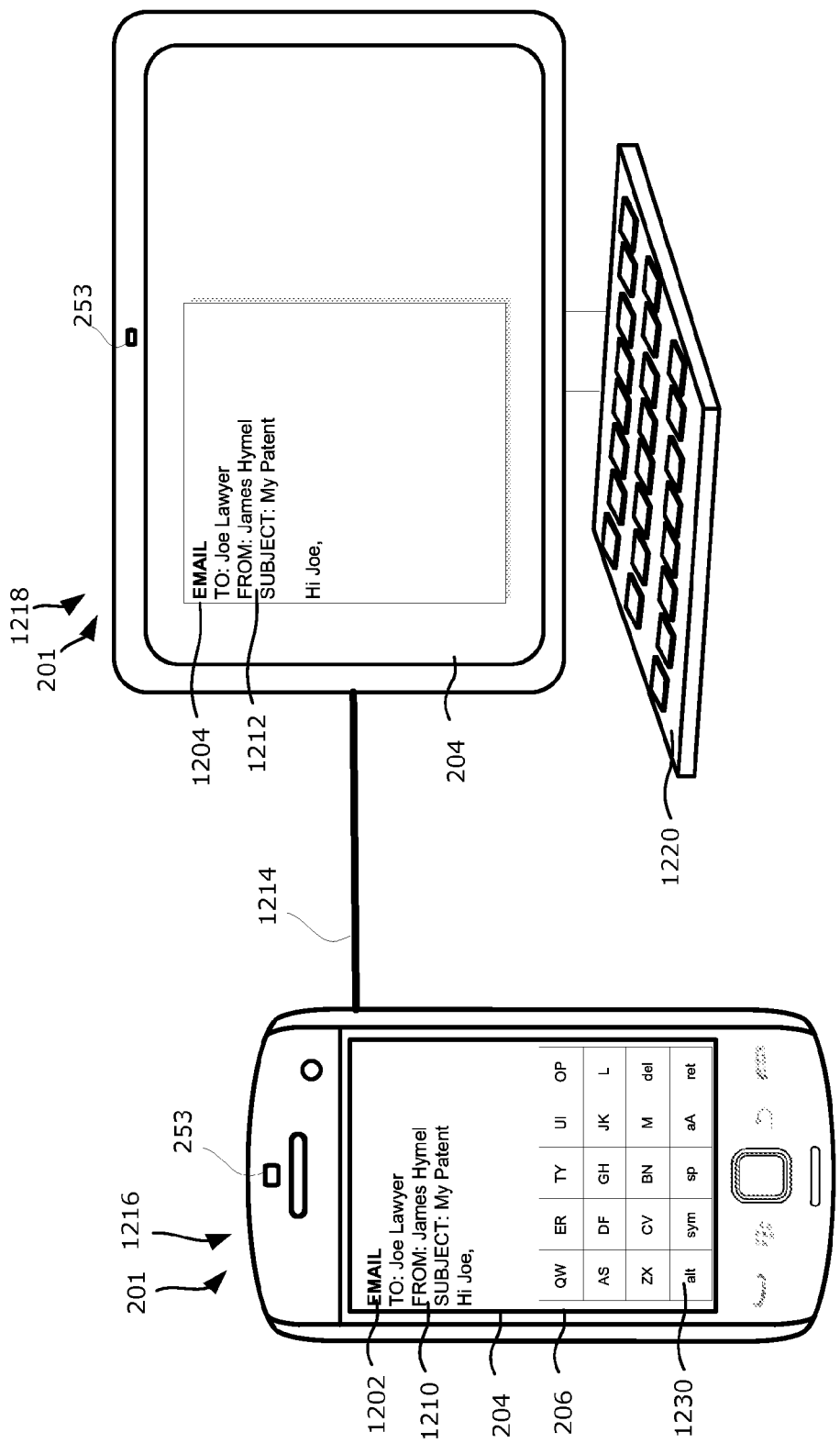
FIG. 12 illustrates an example embodiment of a smartphone and a desktop computer in a preferred device mode related to an email application.

Reference will now be made to FIG. 12 which illustrates an example embodiment for determining a preferred device between two electronic devices 201, wherein the application 225 is an email application. In this example embodiment, the first electronic device 1216 is a smartphone, such as the smartphone illustrated in FIG. 2, and the second electronic device 1218 is a desktop computer.

In this example embodiment, the first electronic device 1216 and the second electronic device 1218 have established a direct wired connection 1214, using a serial communications port, for example via a USB cable.

The first electronic device 1216 may receive a request related to an email application 1202 to compose an email. In processing the request, the first electronic device 1216 displays on a display 204 associated with the first electronic device a touch based keyboard 1230 for typing the message. As may be appreciated by those skilled in the art, composing a message by typing on a touch based keyboard is more difficult for most users that using a physical full size keyboard, such as keyboard 1220 associated with the second electronic device 1218.

Composing the email message has been initiated on the first electronic device 1216. A user may connect a USB cable 1214 between the first electronic device 1214 and the second electronic device 1218, establishing a connection between the two electronic devices 201. In other example embodiments, a wireless connection, for example via a Bluetooth™ connection may be used. In other example embodiments, the connection may be established prior to receiving the request.

By establishing the connection, the request to compose an email message may be sent to the second electronic device 1218. Further, by applying method 700 to determine a preferred device, wherein an input is received at each electronic device 201 by establishing a connection between them. The user attention level associated with the second electronic device 1218 may be determined to be higher than the user attention level associated with the first electronic device 1216 as the user interacts with the second electronic device 1218. Other inputs may also be used; such as an orientation sensor 251 associated with the first electronic device 1216, or a camera 253 associated with the second electronic device 1218.

In alternate example embodiments, applying method 900 to determine a preferred device may be possible, wherein the limitations associated with text entry for each device may be compared and thus a preference for using the second electronic device 1218 may be determined. In alternate example embodiments, applying methods 1000 to determine a preferred device may be possible, wherein a historical preference associated with an email application may indicate a preference for using the second electronic device 1218.

As previously discussed, by processing the request on the second electronic device 1218, a user may be able to take advantage of keyboard 1220 for text entry. As illustrated by 1210, text may be entered in association with the request on the first electronic device 1216. In example embodiments, transferring the text to the preferred device, as shown in 1212, allows for a seamless transition from processing the request on the first electronic device 1216 to processing the request on the second electronic device 1218 for the user.

An Example Embodiment Relating to a Video Application

Figure 13:
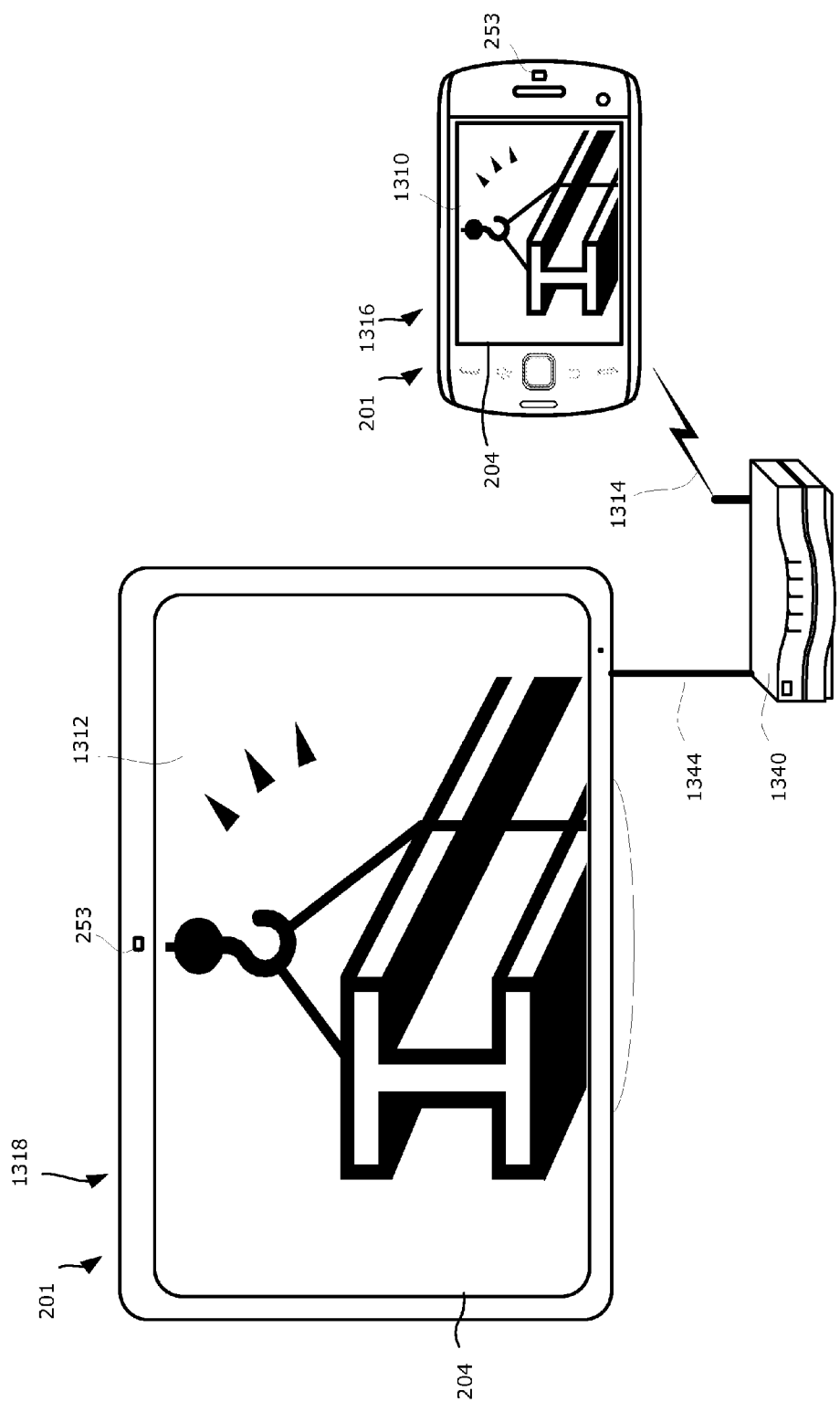
FIG. 13 illustrates an example embodiment of a smartphone and a television in a preferred device mode related to a video application.

Reference will now be made to FIG. 13 which illustrates an example embodiment for determining a preferred device between two electronic devices 201, wherein the application 225 is a video application. In this example embodiment, the first electronic device 1316 is a smartphone, such as the smartphone illustrated in FIG. 2, and the second electronic device 1218 is a television.

In this example embodiment, the first electronic device 1316 and the second electronic device 1318 have established a wireless connection 1314 through a network. The first electronic device 1316 is connected wirelessly using a short range communication subsystem 262 to an access point 1340 over a Wi-Fi communication protocol. The second electronic device 1318 is connected to the access point 1340 using a network cable 1344, such as an Ethernet cable.

The first electronic device 1316 may receive a request related to a video application 1310 to playback a video. In processing the request, the first electronic device 1316 displays on a display 204 associated with the first electronic device the video associated with the request. As may be appreciated by those skilled in the art, watching a video on a small display, such as that associated with a smartphone is undesirable, especially when a large television is available.

When a connection is established between the two electronic devices, the video may already be playing, or the request associated with the video may have not yet been received by the first electronic device 1316. Once the connection is established, the first electronic device 1316 may send the request to the second electronic device 1318. In some example embodiments, the first electronic device 1316 may only send the request to the second electronic device 1318 if the second electronic device 1318 is determined to be the preferred device.

To determine the preferred device, the method 800 may be used. A camera input may be received at a camera 253 associated with the second electronic device 1318, indicating that a user is gazing in the direction of the second electronic device 1318. This may be a natural reaction; a user may look at the television if they wish to view the video on the large display 253 associated with the television.

In other example embodiments, a method 900 may be used to analyze the limitations associated with each electronic device 201 in relation to a video playback application 225. In comparing the limitations, the second electronic device 1318 may be determined to be the preferred device. Furthermore, method 1000 may also apply; a database may indicate a historical preference associated with the second electronic device 1318 in relation to a video playback application 225.

To enable the playback of the video on the second electronic device 1318, the first electronic device 1316 may make the video file available to the second electronic device 1318 over the established wireless connection. In other example embodiments, the second electronic device 1318 may determine if the video file is available on a storage device associated with the second electronic device 1318 instead, either through a network, or through a direct connection with a storage device.

While the present disclosure is primarily described in terms of methods, a person of ordinary skill in the art will understand that the present disclosure is also directed to various apparatus such as a handheld electronic device including components for performing at least some of the example aspects and features of the described methods, be it by way of hardware components, software or any combination of the two, or in any other manner.

Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure. Furthermore, the term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various example embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described example embodiments may be selected to create alternative example embodiments included of a sub-combination of features which may not be explicitly described above. In addition, features from one or more of the above-described example embodiments may be selected and combined to create alternative embodiments included of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method, implemented by a processor of a first electronic device, comprising:

establishing a connection with a second electronic device to share information between the electronic devices;

receiving, by means of an input interface of the first electronic device, a request, made via a user interaction with an application resident on the first electronic device, to display first content on the first electronic device;

initiate processing of the request to display the first content on the first electronic device;

determining which of the first electronic device and the second electronic device is a preferred device to process the request to display the first content, the determining including:

receiving, at the first electronic device, a list of resources associated with the second electronic device from the second electronic device, the list of resources including one or more display hardware resources associated with the second electronic device; and comparing, by the processor of the first electronic device, first limitations associated with displaying the first content using display hardware resources associated with the first electronic device and second limitations associated with displaying the first content using the display hardware resources associated with the second electronic device to determine which one of the first electronic device and the second electronic device has less display hardware limitations associated with displaying the first content;

applying one or more historical preferences associated with processing the request, wherein the one or more historical preferences are determined based on a number of times that the first electronic device has been used historically to process the request and a number of times that the second electronic device has been used historically to process the request;

in response to determining that the second electronic device has less display hardware limitations associated with displaying the first content compared to the first electronic device and that the second electronic device has been used a greater number of times historically to process the request:

causing the processing of the request to display the first content to be stopped on the first electronic device; and sending the request to the second electronic device to display the first content on the second electronic device.

2. The method of claim 1, wherein determining the preferred device further comprises:

obtaining first sensor data from a first input interface associated with the first electronic device;

determining a first user attention level associated with the first electronic device based on the first sensor data;

receiving a second user attention level associated with the second electronic device from the second electronic device, wherein the second user attention level is determined based on second sensor data obtained from a second input interface associated with the second electronic device; and comparing the first user attention level with the second user attention level to determine the preferred device.

3. The method of claim 2, wherein determining which of the first electronic device and the second electronic device is the preferred device comprises:

determining which of the first user attention level and the second user attention level defines a greater attention level, and wherein if the first user attention level defines a greater attention level, the first electronic device is determined to be the preferred device, and wherein if the second user attention level defines a greater attention level, the second electronic device is determined to be the preferred device.

4. The method of claim 1, wherein the application is a web browsing application, email application or a video application.

5. The method of claim 1, wherein determining the preferred device further comprises determining which of the first electronic device and the second electronic device is in active use.

6. The method of claim 5, wherein determining which one of the first device and the second device is in active use comprises determining that an input is received on an input interface associated with one of the devices.

7. The method of claim 1, wherein determining that the first electronic device has less display hardware limitations associated with displaying the first content compared to the second electronic device comprises determining that a display associated with the first electronic device has a higher resolution than a display associated with the second electronic device.

8. The method of claim 1, wherein determining that the first electronic device has less display hardware limitations associated with displaying the first content compared to the second electronic device comprises determining that a display associated with the first electronic device has a higher contrast ratio than a display associated with the second electronic device.

9. The method of claim 1, wherein determining that the first electronic device has less display hardware limitations associated with displaying the first content compared to the second electronic device comprises determining that a display associated with the first electronic device has a larger size than a display associated with the second electronic device.

10. The method of claim 1, wherein the first content comprises an email message and wherein determining the preferred device further comprises detecting that one of the first electronic device and the second electronic device includes an input interface for text entry is the preferred device and determining that the device including the input interface for text entry is the preferred device.

11. A first electronic device comprising:
a communication subsystem for communicating with a second electronic device;
an input interface;
a memory; and
a processor coupled to the communication subsystem, the input interface, and the memory, the processor configured to:
establish a connection with a second electronic device to share information between the electronic devices;
receive, by means of the input interface of the first electronic device, a request, made via a user interaction with an application resident on the first electronic device, to display first content on the first electronic device;
initiate processing of the request to display the first content on the first electronic device;
determine which of the first electronic device and the second electronic device is a preferred device to process the request to display the first content, the determining including:
receiving, at the first electronic device, a list of resources associated with the second electronic device from the second electronic device the list of resources including one or more display hardware resources associated with the second electronic device; and
comparing, by the processor of the first electronic device, first limitations associated with displaying the first content using display hardware resources associated with the first electronic device and second limitations associated with displaying the first content using the display hardware resources associated with the second electronic device to determine which one of the first electronic device and the second electronic device has less display hardware limitations associated with displaying the first content;
applying one or more historical preferences associated with processing the request, wherein the one or more historical preferences are determined based on a number of times that the first electronic device has been used historically to process the request and a number of times that the second electronic device has been used historically to process the request;
in response to determining that the second electronic device has less display hardware limitations associated with displaying the first content compared to the first electronic device and that the second electronic device has been used a greater number of times historically to process the request:
cause the processing of the request to display the first content to be stopped on the first electronic device; and
send the request to the second electronic device to display the first content on the second electronic device.

12. The electronic device of claim 11, wherein the first content comprises an email message and wherein determining the preferred device further comprises detecting that one of the first electronic device and the second electronic device includes an input interface for text entry is the preferred device and determining that the device including the input interface for text entry is the preferred device.

13. A method, implemented by a processor of a second electronic device, comprising:
establishing a connection with a first electronic device to share information between the electronic devices;
receiving a communication from the first electronic device indicating that a request to display first content on the first electronic device is input at the first electronic device, the communication including a list of resources associated with the first electronic device, the list of resources including one or more display hardware resources associated with the first electronic device;
determining which of the first electronic device and the second electronic device is a preferred device to process the request to display the first content, the determining including:
comparing, by the processor of the second electronic device, first limitations associated with displaying the first content using display hardware resources associated with the first electronic device and second limitations associated with displaying the first content using display hardware resources associated with the second electronic device to determine which one of the first electronic device and the second electronic device has less display hardware limitations associated with displaying the first content;

applying one or more historical preferences associated with processing the request, wherein the one or more historical preferences are determined based on a number of times that the first electronic device has been used historically to process the request and a number of times that the second electronic device has been used historically to process the request;

in response to determining that the second electronic device has less display hardware limitations associated with displaying the first content compared to the first electronic device device and that the second electronic device has been used a greater number of times historically to process the request, transmitting, to the first electronic device, an instruction to cause the processing of the request to display the first content to be stopped and to send the request to the second electronic device; and in response to receiving the request from the first electronic device, displaying the first content on the second electronic device.

14. The method of claim 13, further comprising:

determining that the first electronic device has less display hardware limitations associated with displaying the first content compared to the second electronic device; and in response to determining that the first electronic device has less display hardware limitations associated with displaying the first content compared to the second electronic device, sending an instruction to the first electronic device to process the request on the first electronic device.

15. The method of claim 13, wherein determining the preferred device further comprises:

obtaining second sensor data from a second input interface associated with the second electronic device;

determining a second user attention level associated with the second electronic device based on the second sensor data;

receiving a first user attention level associated with the first electronic device from the first electronic device, wherein the first user attention level is determined based on first sensor data obtained from a first input interface associated with the first electronic device; and comparing the first user attention level with the second user attention level to determine the preferred device.

16. The method of claim 15, wherein comparing includes:

determining which of the first user attention level and the second user attention level defines a greater attention level, and wherein if the first user attention level defines a greater attention level, the first electronic device is determined to be the preferred device, and wherein if the second user attention level defines a greater attention level, the second electronic device is determined to be the preferred device.

17. The method of claim 13, wherein the first content comprises an email message and wherein determining the preferred device further comprises detecting that one of the first electronic device and the second electronic device includes an input interface for text entry is the preferred device and determining that the device including the input interface for text entry is the preferred device.

* * * * *